Aug. 14, 1956     E. HODGE     2,758,630
REINFORCED INSULATOR PAD AND METHOD OF MAKING SAME
Filed Oct. 1, 1952     2 Sheets-Sheet 1
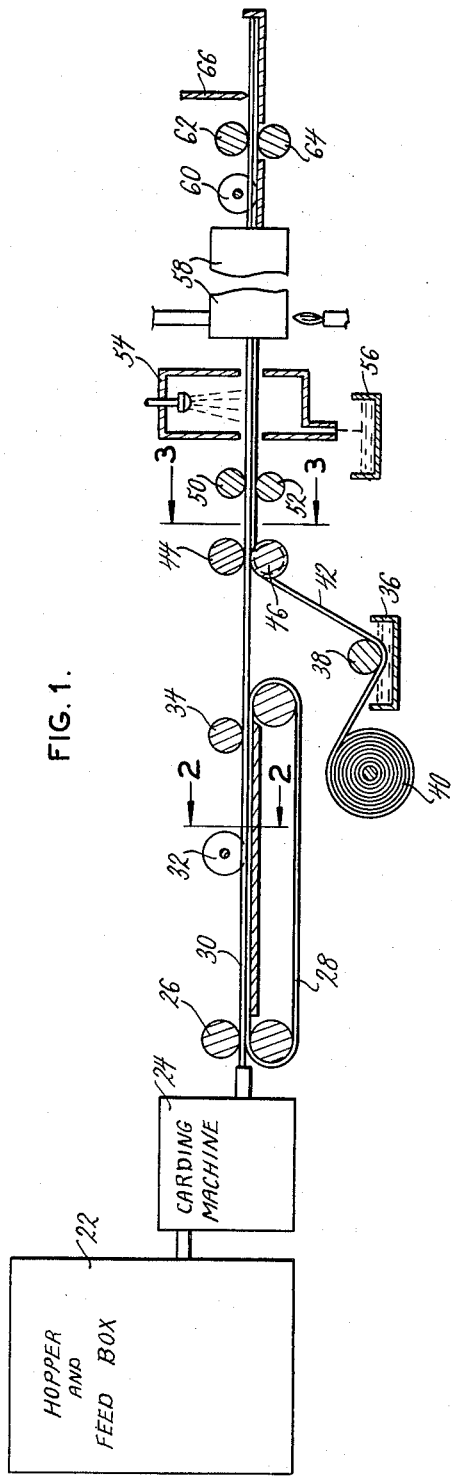
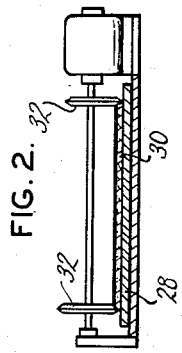
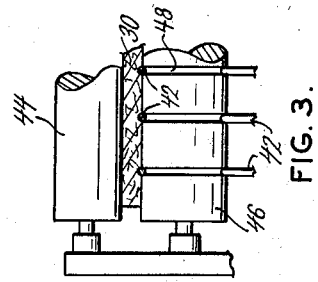
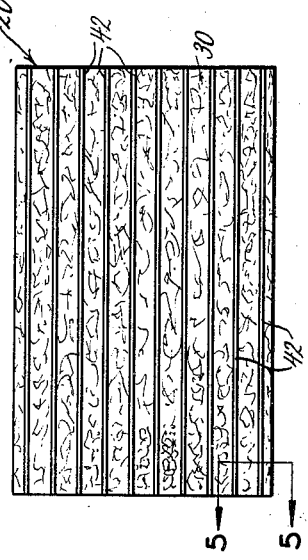
INVENTOR.
EDWARD HODGE
BY *Gravely, Lieder, Woodruff & Gees*
ATTORNEYS.

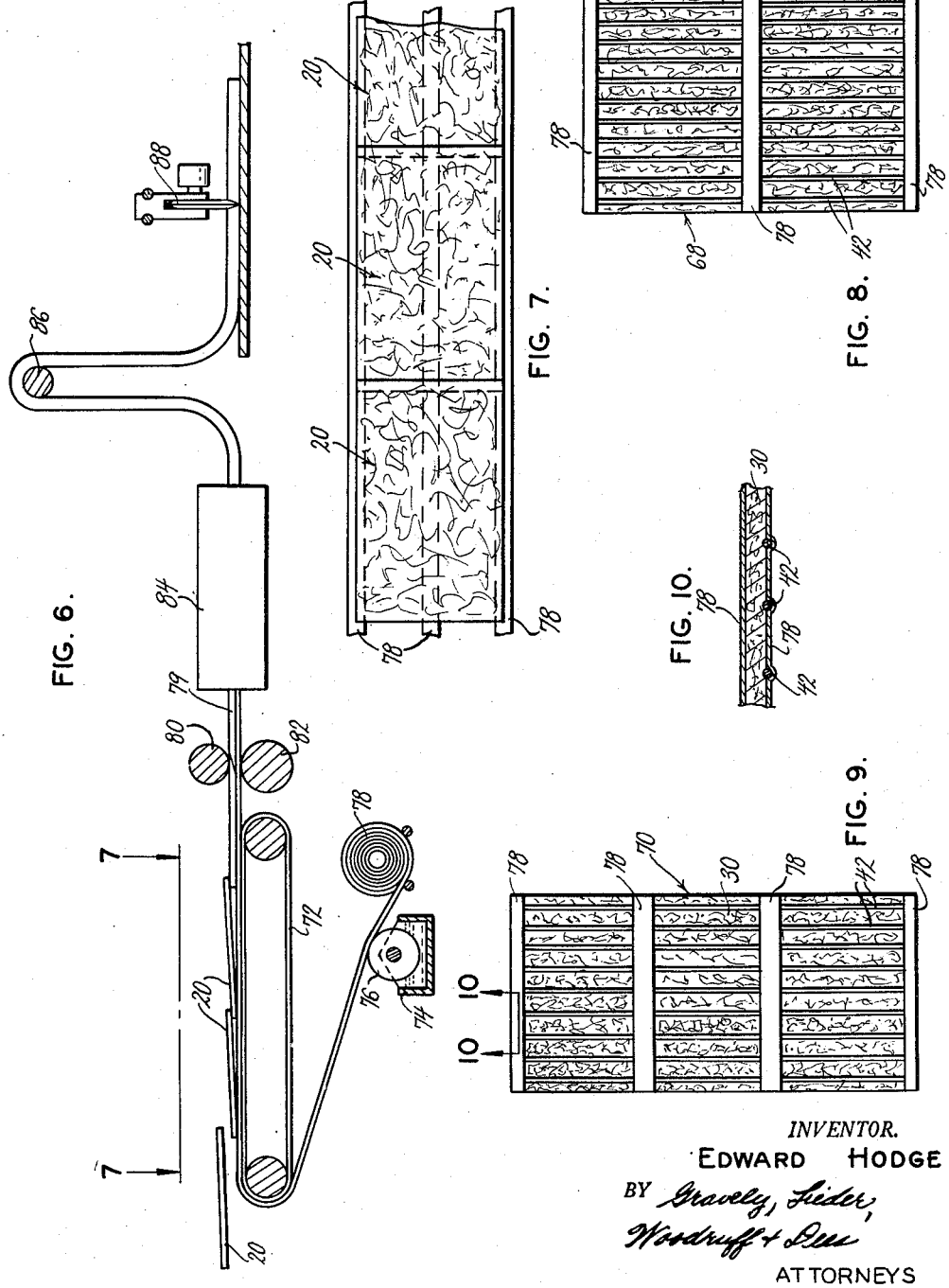

United States Patent Office 2,758,630
Patented Aug. 14, 1956

2,758,630

REINFORCED INSULATOR PAD AND METHOD OF MAKING SAME

Edward Hodge, St. Louis, Mo., assignor, by mesne assignments, to Textron American, Inc., Providence, R. I., a corporation of Rhode Island Application October 1, 1952, Serial No. 312,570

10 Claims. (Cl. 154—29)

The present invention relates generally to the upholstery art and more particularly to a novel reinforced insulator pad made from fibrous material, which is especially suitable for use in the manufacture of upholstered furniture, automobile seats, and the like, and to the method of making it.

One of the most widely used upholstery constructions comprises a series of spaced hour-glass type springs disposed on a suitable supporting framework, and a covering of burlap stretched over the upper ends of the springs and fastened to the sides of the supporting framework by means of rings. A filler pad of cotton or like material is placed on top of the burlap and a fabric cover stretched over the filler pad. This type of construction has the particular disadvantage that the burlap yields when the seat is used, whereby the burlap and material of the filler pad above it are forced downwardly into the bell of the springs and between them, thereby producing a lumpy seat. Also, a construction of this type requires a relatively large amount of filler material in order to fill the depressions formed in the ends of the springs and between them.

These disadvantages were overcome to a slight extent by laying wires between the springs and the burlap, and also by interweaving wires in the burlap. One of the most recent developments in this art is an insulator pad made by fastening cords between two sheets of plastic material such as polyethylene.

However, many of these known constructions are relatively expensive and most of them are not very satisfactory because the insulator pad continues to sag and stretch between the reinforcing members.

It is an object of the present invention therefore, to provide a novel reinforced insulator pad for use in the manufacture of furniture and automobile seats and the like, which is relatively inexpensive to manufacture and which yields only enough to provide the necessary resiliency for comfort and not enough to cause the seat to become lumpy. More particularly, it is an object to provide such a pad which is made from a thin layer of intertwined relatively unyielding fibrous material, and which has a series of spaced elongated reinforcing members fastened thereto. Specifically, it is an object to provide such a pad which is made from a thin layer or veil of intertwined fibers such as sisal, hair, coconut hulls, or thet like, with the fibers bonded together at the points of intersection thereof, and having a series of spaced cords or wires embedded in one surface of the fibrous layer and bonded thereto by suitable cementitious material such as liquid latex, animal glue, or the like.

Another object is to provide a reinforced insulator pad which does not have to be ring fastened to the spring supporting framework.

Another object is to provide a novel method for making the reinforced insulator pad previously described.

Another object is to provide a reinforced insulator pad of the aforementioned construction in which the ends of the cords or wires are covered by a tape which aids in holding the cords or wires onto the layer of fibrous material.

Further objects and advantages of the present invention will be apparent from the following detailed description, reference being had to the accompanying drawings wherein preferred embodiments of the present invention are shown.

The reinforced insulator pad which forms a part of the present invention, comprises a relatively thin layer of intertwined fibers, preferably of a relatively non-yielding or non-stretchable type such as sisal, having at least some of the fibers coated with a binder such as liquid latex to cause a binding together of them; and having a plurality of spaced elongated reinforcing members, preferably of spring wire or the like, fastened to one side of the layer as with liquid latex.

If desired, the reinforced pad can have fabric or thin metallic tape fastened about each side edge of the pad and the ends of the reinforcing members adjacent thereto, and may have one or more tapes fastened to the surface of the pad over the reinforcing members so as to aid in maintaining them in position.

In the drawings:

Fig. 1 is a schematic side elevational view of a method of forming a fibrous reinforced insulator pad which has the fibers thereof bonded together, and which contains a series of spaced wires embedded in and bonded to one side of the pad and extending longitudinally thereof, Fig. 2 is a vertical transverse sectional view taken on the line 2—2 in Fig. 1, showing the slitting knives, Fig. 3 is an enlarged fragmentary vertical transverse sectional view taken on the line 3—3 in Fig. 1, illustrating the step of pressing the wires against the underside of the fiber pad, Fig. 4 is a bottom plan view of one form of reinforced pad constructed in accordance with the teachings of the present invention, the reinforcing members extending longitudinally of the pad, Fig. 5 is an enlarged fragmentary transverse sectional view taken on the line 5—5 in Fig. 4, Fig. 6 is a schematic side elevational view of a method of forming a reinforced insulator pad in which the reinforcing members extend transversely of the pad, and the side edges of the pad and the ends of the reinforcing members are covered with tape, Fig. 7 is an enlarged top plan view taken on the line 7—7 in Fig. 6, looking down on the individual pads as they are being placed end to end and slightly overlapping, with the reinforcing member extending transversely of the pad, Fig. 8 is an enlarged fragmentary bottom plan view of a reinforced pad with taped side edges made by using the method shown schematically in Fig. 6, Fig. 9 is a bottom plan view of a modified type of pad made by using the method shown schematically in Fig. 6, and Fig. 10 is an enlarged fragmentary sectional view taken on the line 10—10 in Fig. 9.

Referring to the drawings more particularly by reference numerals, 20 (Fig. 4) indicates generally one form of reinforced insulator pad embodying the teachings of the present invention and formed in accordance with the method shown schematically in Fig. 1.

As shown schematically in Fig. 1, a suitable fibrous material, preferably sisal, is placed in a combination hopper and feed box 22. The fibrous material passes from the feed box 22 through a carding machine 24 which discharges it under a take-off roller 26 and onto an endless conveyor 28.

After the fibrous material passes under the roller 26, it is in the form of a thin layer or veil 30 in which the fibers are intertwined and intersect at various points.

The veil 30 is carried by the conveyor 28 under spaced slitter knives 32 which trim off the rough side edges of the veil.

The veil 30 then passes under a smooth compression roller 34 where it is further compressed.

A trough 36 of bonding material, preferably liquid latex, is provided under the veil 30 of fibrous material, and disposed therein is a roller 38 which extends downwardly into the latex.

A plurality of rolls 40 of elongated reinforcing material, preferably spring wire, are positioned so that spaced wires 42 can be threaded from them, under the roller 38 and through the liquid latex, and thence upwardly adjacent the underside of the moving veil 30.

A smooth roller 44 (Figs. 1 and 3) is disposed above the veil 30, and a grooved roller 46 is disposed below it in cooperation therewith, the latter roller containing a plurality of spaced grooves 48 which receive the wires 42 coated with liquid latex, and press them against the underside of the veil 30 in predetermined spaced relationship.

The veil 30, with the wires 42 disposed against its underside, then passes through smooth compression rollers 50 and 52 which press the wires 42 into the fibrous surface of the veil 30.

From the compression rollers 50 and 52, the veil 30 and wires 42 pass through a spray booth 54 wherein a binder, preferably liquid latex, is sprayed onto and through the veil 30 so as to coat the fibers thereof. A pan 56 is provided under the spray booth 54 to receive the excess latex which drips off of the veil 30.

The veil 30 and wires 42 then pass through a drying chamber 58 in which the moisture is removed and the latex caused to set so as to firmly bond together the fibers, and bond the wires 42 to the underside of the veil 30.

The veil 30 then passes under another set of slitter knives 60 which trim it to the desired width, and thence between compression rollers 62 and 64.

The veil 30 with the reinforcing members 42 fastened thereto, is then cut into predetermined lengths by a shear 66, which cuts cleanly through the fibers and the wires.

This method results in a reinforced insulator pad 20 (Fig. 4) in which the wires 42 are embedded in one side of the pad and tightly bonded to the fibers thereof, and the intermingled and intersecting fibers are coated with the binder and bonded together at the points where they intersect, so as to provide a pad which has the desired amount of resiliency but which is unyielding in the sense that when it is used on top of springs, the batt or filler pad on top of it cannot be forced downwardly into the springs or between them by normal usage, as often occurs when presently known pads are used. The binding together of the fibers by the latex overcomes the stretching and yielding which is inherent in untreated fabric material such as burlap and the like.

In the reinforced pad 20 the wires extend longitudinally of it. If it is desirable to have a reinforced pad in which the wires extend transversely, or in which the wires extend transversely and the ends thereof are covered with a tape of fabric or metal, a modified pad 68 which has three tapes fastened thereto (Fig. 8), or a further modified pad 70 which has four tapes fastened thereto (Fig. 9), can be provided by employing the method shown schematically in Fig. 6.

In this method, an endless conveyor 72 is provided, and a trough 74 positioned below it, the trough containing a binder which is preferably liquid latex.

A roller 76 is rotatably mounted in the trough so that its surface is always wetted with the binder material.

Two or more rolls of fabric or metallic tape 78 are placed adjacent the trough 74, the number of rolls depending on whether the reinforced pad is to have only the ends of the wires covered, or also have one or more lengths of tape fastened to the body of the pad over the reinforcing wires.

If the reinforced pad 68 (Fig. 8) is to be formed, three rolls of tape are used, one adjacent each edge of the pad, and one at the center thereof. The tapes 78 are threaded over the roller 76 so as to have one side thereof coated with the liquid latex, and thence upwardly on top of the conveyor 72 with the latex coated side of each tape facing upwardly.

The previously formed reinforced pads 20 of the type shown in Fig. 4, are then placed on the conveyor 72 on top of the tapes 78 with the wires 42 on the bottom and extending crosswise of the conveyor 72. Adjacent front and rear edges of the pads 20 are overlapped a short distance so as to form a continuous pad 79, and the individual pads 20 pressed onto the latex coated surfaces of the tapes 78 so as to maintain them in overlapping position thereon.

The continuous pad 79 formed in this manner is then passed between compression rollers 80 and 82 to cause the tapes 70 to firmly adhere to the wires 42 and the fibers of the pad 79, and to flatten the overlapping ends of the individual pads 20.

Each of the tapes 78 at the ends of the long continuous pad 79 is positioned so that the side edge of the pad approximately coincides with the center of the tape, whereby about one half the width of the tape extends beyond the side edge of the pad (Fig. 7).

The pad 79 is then passed through a folding machine 84 which folds the outwardly extending portion of the side tape, upwardly and onto the top of the pad 79.

From the folding machine 84, the pad 79 passes over a slack or idler roller 86 and is then cut into predetermined lengths by means of a cutter 88.

The reinforced and taped insulator pad 68 formed in this manner, is shown in Fig. 8. If one desires to form the pad 70 (Fig. 9), four tapes are used, i. e., one at each side and two at the body of the fibrous material.

Thus, it is apparent that there has been provided several forms of reinforced insulator pads and methods of making them which fulfill all of the objects and advantages sought therefor.

The pads have the necessary resiliency for comfort when they are used in upholstered furniture, automobile seats, and the like, but are sufficiently unyielding to prevent the filler material used in the seat on top of them, from being forced downwardly into and between the springs by normal usage. This is apparently due to the bonding together of the intertwined fibers in the pad, augmented by the reinforcing wires which are maintained in position by being bonded to the one side of the pad.

Furthermore, because of this "non-cupping" of the filler material much less of it is needed when reinforced insulator pads embodying the teachings of the present invention are used, than when known pads are used. In the one test it was determined that as much as 20% less filler cotton was used than when an insulator pad of burlap and wires was used.

In addition a reinforced fiber insulator pad constructed in accordance with the teachings of the present invention does not have to be ring fastened to the spring supporting network. It can be easily and quickly fastened directly to the filler pad by stitching or bonding it thereto.

It is to be understood that the foregoing description and accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. An insulator pad for use in the manufacture of upholstered furniture, comprising no more than a single layer of compressed intersecting fibers, the fibers being coated with a binder and bonded together at the points of intersection thereof; and a plurality of spaced elongated reinforcing members fastened to one side of the fibrous layer.

2. An insulator pad for use in the manufacture of upholstered furniture, comprising no more than a single layer of compressed intermingled relatively unyielding fibers, the fibers being coated with a binder and bonded together at the points of intersection thereof; and a plurality of spaced elongated resilient reinforcing members embedded in one side of the layer and fastened thereto.

3. An insulator pad for use in the manufacture of upholstered furniture, comprising a layer of intersecting fibers and having opposed side edges, the fibers being coated with a binder and bonded together at the points of intersection thereof; a series of spaced elongated resilient reinforcing members fastened to one side of the fibrous layer and extending transversely thereof; and tape fastened about each side edge of the layer and the ends of the reinforcing members adjacent thereto.

4. An insulator pad for use in the manufacture of upholstered furniture, comprising a layer of intersecting fibers and including a body portion and opposed side edges, some of the fibers being coated with a binder and bonded together at the points of intersection thereof; a series of spaced elongated resilient reinforcing members fastened to one side of the fibrous layer and extending transversely thereof; tape fastened about each side edge of the layer and the ends of the reinforcing members adjacent thereto; and at least one tape fastened to the body portion over the reinforcing members and extending longitudinally of the layer.

5. The method of making a reinforced insulator pad, including the steps of providing an elongated layer of relatively non-yielding intertwined fibers; fastening a plurality of resilient elongated reinforcing members to one surface of the layer in spaced relationship so as to extend longitudinally of the layer; and spraying the layer with liquid latex on the side opposite to the reinforcing members to cause a binding together of the fibers.

6. The method of making a reinforced insulator pad, including the steps of providing an elongated layer of intertwined fibers; positioning a plurality of elongated reinforcing members against one surface thereof so as to extend longitudinally of the layer; coating at least some of the fibers with a binder to cause a binding together of the fibers; cutting the layer into pads of predetermined length having opposed side edges; connecting together a plurality of pads at the side edges thereof to provide an elongated reinforced layer in which the reinforcing members extend transversely thereof; and cutting the layer into pads of predetermined length.

7. The method of making a reinforced insulator pad, including the steps of providing an elongated layer of intertwined fibers; positioning a plurality of elongated reinforcing members against one surface thereof so as to extend longitudinally of the layer; coating at least some of the fibers with a binder to cause a binding together of the fibers; cutting the layer into pads of predetermined length having opposed side edges; connecting together a plurality of pads at the side edges thereof to provide an elongated reinforced layer in which the reinforcing members extend transversely thereof; and fastening tape about the edges of the layer and the ends of the reinforcing members adjacent thereto.

8. The method of making a reinforced insulator pad including the steps of providing an elongated layer of intertwined fibers; fastening a plurality of elongated reinforcing members to one surface thereof in spaced relationship so as to extend longitudinally of the layer; cutting the layer into pads of predetermined length having opposed side edges; connecting together a plurality of pads at the side edges thereof to provide an elongated layer in which the reinforcing members extend transversely thereof; and fastening tape about the edges of the last mentioned layer and the ends of the reinforcing members adjacent thereto.

9. The method of making a reinforced insulator pad, including the steps of providing an elongated layer of relatively non-yielding intertwined fibers; fastening a plurality of resilient elongated reinforcing members to one surface of the layer in spaced relationship; pressing the reinforcing members into the layer of fibers; spraying the layer with liquid latex on the side opposite to the reinforcing members to cause a binding together of the fibers; and passing the sprayed layer through a drying chamber to set the latex.

10. The method of making a reinforced insulator pad, including the steps of providing an elongated layer of relatively non-yielding intertwined fibers; providing a plurality of resilient elongated reinforcing members; coating said members with liquid latex and pressing them into the bottom surface of the layer of fibers in spaced relationship; spraying the top surface of the layer with liquid latex to cause a binding together of the fibers; and passing the sprayed layer through a drying chamber to set the latex.

References Cited in the file of this patent

UNITED STATES PATENTS

| | | |
|---|---|---|
| 5,161 | Fleischmann | June 19, 1847 |
| 240,198 | Stinson | Apr. 12, 1881 |
| 1,211,443 | Heany | Jan. 9, 1917 |
| 2,003,935 | Howard | June 4, 1935 |
| 2,146,870 | Whiteley | Feb. 14, 1939 |
| 2,254,394 | Ratley et al. | Sept. 2, 1941 |
| 2,295,439 | Voigtman | Sept. 8, 1942 |
| 2,308,849 | Young | Jan. 19, 1943 |
| 2,409,951 | Nootens | Oct. 22, 1946 |
| 2,455,534 | Talalay | Dec. 7, 1948 |